United States Patent

Garcia et al.

[11] Patent Number: 6,084,934
[45] Date of Patent: Jul. 4, 2000

[54] NATURAL THROTTLING OF DATA TRANSFER ACROSS ASYNCHRONOUS BOUNDARIES

[75] Inventors: Enrique Garcia, Tucson, Ariz.; Adalberto Guillermo Yanes, Rochester, Minn.; Juan Antonio Yanes, Tucson, Ariz.

[73] Assignee: International Business Machines Corporation, Armonk, N.Y.

[21] Appl. No.: 08/811,776

[22] Filed: Mar. 6, 1997

[51] Int. Cl.[7] .............................. H04L 25/38; H04L 7/00; H04J 3/06
[52] U.S. Cl. ....................... 375/370; 375/358; 370/516
[58] Field of Search ................................ 375/370, 357, 375/359, 360, 355, 371, 358, 354; 370/420, 421, 516; 327/142, 141, 146, 144, 155; 395/559, 551, 555, 558

[56] References Cited

U.S. PATENT DOCUMENTS

| | | | |
|---|---|---|---|
| 4,110,558 | 8/1978 | Kageyama et al. | 375/357 |
| 4,320,520 | 3/1982 | Graham | 375/257 |
| 4,476,527 | 10/1984 | Clayton, IV | 395/849 |
| 4,761,763 | 8/1988 | Hicks | 364/900 |
| 4,761,800 | 8/1988 | Lese et al. | 375/370 |
| 4,882,739 | 11/1989 | Potash et al. | 375/358 |
| 4,893,318 | 1/1990 | Potash et al. | 375/358 |
| 5,042,054 | 8/1991 | Yoon | 375/357 |
| 5,103,446 | 4/1992 | Fischer | 370/85.1 |
| 5,258,979 | 11/1993 | Oomuro et al. | 370/232 |
| 5,265,218 | 11/1993 | Testa et al. | 395/325 |
| 5,502,752 | 3/1996 | Averbuch et al. | 257/678 |
| 5,515,359 | 5/1996 | Zheng | 370/231 |
| 5,524,126 | 6/1996 | Clewer et al. | 375/355 |
| 5,610,911 | 3/1997 | Ishikawa et al. | 370/503 |
| 5,680,596 | 10/1997 | Iizuka et al. | 395/559 |
| 5,734,646 | 3/1998 | I et al. | 370/335 |
| 5,737,633 | 4/1998 | Suzuki | 395/849 |

*Primary Examiner*—Chi H. Pham
*Assistant Examiner*—Khai Tran
*Attorney, Agent, or Firm*—Ohlandt, Greeley, Ruggiero & Perle

[57] ABSTRACT

A data transmission system includes a sender and a receiver, both employing different clock rates and a data bus coupled between the sender and the receiver for transmitting signals therebetween. The receiver generates an enable signal from the receiver clock to control data transmission at the sender. The enable signal is a pulse generated at each rising edge of the receiver clock and corresponds to the data transfer rate of the receiver clock. A detector module, located at the sender, receives and captures the asynchronous enable signal and initiates transmission of one data byte for each pulse of the enable signal, thereby automatically adjusting the data transfer rate of the sender to the data transfer rate of the receiver.

9 Claims, 4 Drawing Sheets

NATURAL THROTTLING OF DATA TRANSFER ACROSS ASYNCHRONOUS BOUNDARIES

FIELD OF INVENTION

The present invention relates to data transmission across asynchronous boundaries and more particularly, to detecting and automatically adjusting the data transfer rate of a sender to the data transfer rate of a receiver.

DESCRIPTION OF THE PRIOR ART

Data transmission systems currently utilize a buffer at the receiver and start/stop communication protocols to perform data transfer across asynchronous communication systems, wherein the sender and receiver employ different clock rates. In a typical case, when the clock rate of the sender is faster than the clock rate of the receiver, the sender continuously transmits data until the receiver reaches a buffer threshold. The receiver then signals the sender to stop transmitting data, while data is offloaded from its buffer. When the receiver is capable of accepting more data, it signals the sender to resume data transmission. Such start/stop behavior often results in a degradation of the overall data transfer rate and performance of the asynchronous system.

One approach to remedying this problem is to match the data transfer rates of the sender and the receiver. For instance, U.S. Pat. No. 5,502,752 (Averbuch et al) discloses an apparatus and method for clock rate matching in independent networks. The Averbuch et al. system compares the data transfer rates and adds or deletes full bits, ½ bits and ¼ bits, as required, to speed up or slow drown the data transfer rate. Such a system requires an allotment of error bits (to be added or deleted) in the data transfer chain which increases transmission time and results in a loss of efficiency in the overall data transmission rate.

U.S. Pat. No. 4,761,800 (Lese et al.) discloses an asynchronous interface which determines the incoming data transfer rate and utilizes a baud rate generator to match the data transfer rate at the receiver to the incoming data transfer rate. Such a system requires an initial delay to enable a processor to sample the incoming data to ascertain the incoming data transfer rate. After the initial delay, a new receiver data transfer rate is generated and the data originally transmitted for sampling is re-transmitted. The initial delay, in addition to re-transmission, degrades the overall data transmission rate and performance of the system.

Accordingly, it is a fundamental object of the present invention to provide a data transmission system which achieves a high data transfer rate without need for a start/stop protocol.

Another object of the invention is to provide an enhanced rate of data transfer between a sender and a receiver when each uses a different clock frequency.

It is a further object of the invention to provide a data transmission system which requires minimal usage of a receiver buffer.

SUMMARY OF THE INVENTION

A data transmission system incorporating the invention includes a sender and a receiver, both employing different clock rates and a data bus coupled between the sender and the receiver for transmitting signals therebetween. The receiver generates an enable signal from the receiver clock to control data transmission at the sender. The enable signal is a pulse generated at each rising edge of the receiver clock and corresponds to the maximum data transfer rate that can be accommodated by the receiver clock. A detector module, located at the sender, receives and captures the enable signal and initiates transmission of one data byte for each pulse of the enable signal, thereby automatically adjusting the data transfer rate of the sender to the data transfer rate of the receiver.

The present invention provides a data transmission system that avoids the inefficiencies of the start/stop asynchronous scenarios. As previously mentioned, the data transfer rate of the sender is automatically tuned to the data transfer rate that can be accommodated by the receiver. This results in a one for one correspondence in transmission and reception. The receiver thus never reaches a buffer threshold, thereby forgoing the need for start/stop protocols.

The present invention also provides a data transmission system in which a receiver can utilize a smaller buffer without sacrificing data transmission speed. Receivers are typically equipped with buffers to temporarily store transmitted data when the data transfer rate of the sender is faster than the data transfer rate of the receiver. Such buffers allow data to be transmitted without synchronization of both the receiver clock and the sender clock. The buffer size varies directly with the data transmission rate. That is to say, as the data transmission speed at the sender increases, the buffer size needed at the receiver also increases, unless a start/stop protocol is utilized. The present invention, instead, provides a one for one correspondence in transmission and reception and generally requires a minimal buffer size.

Other and further objects, advantages and features of the present invention will be understood by reference to the following specification in conjunction with the annexed drawings, wherein like parts have been given like numbers.

DESCRIPTION OF THE PREFERRED EMBODIMENTS

Figure 1:
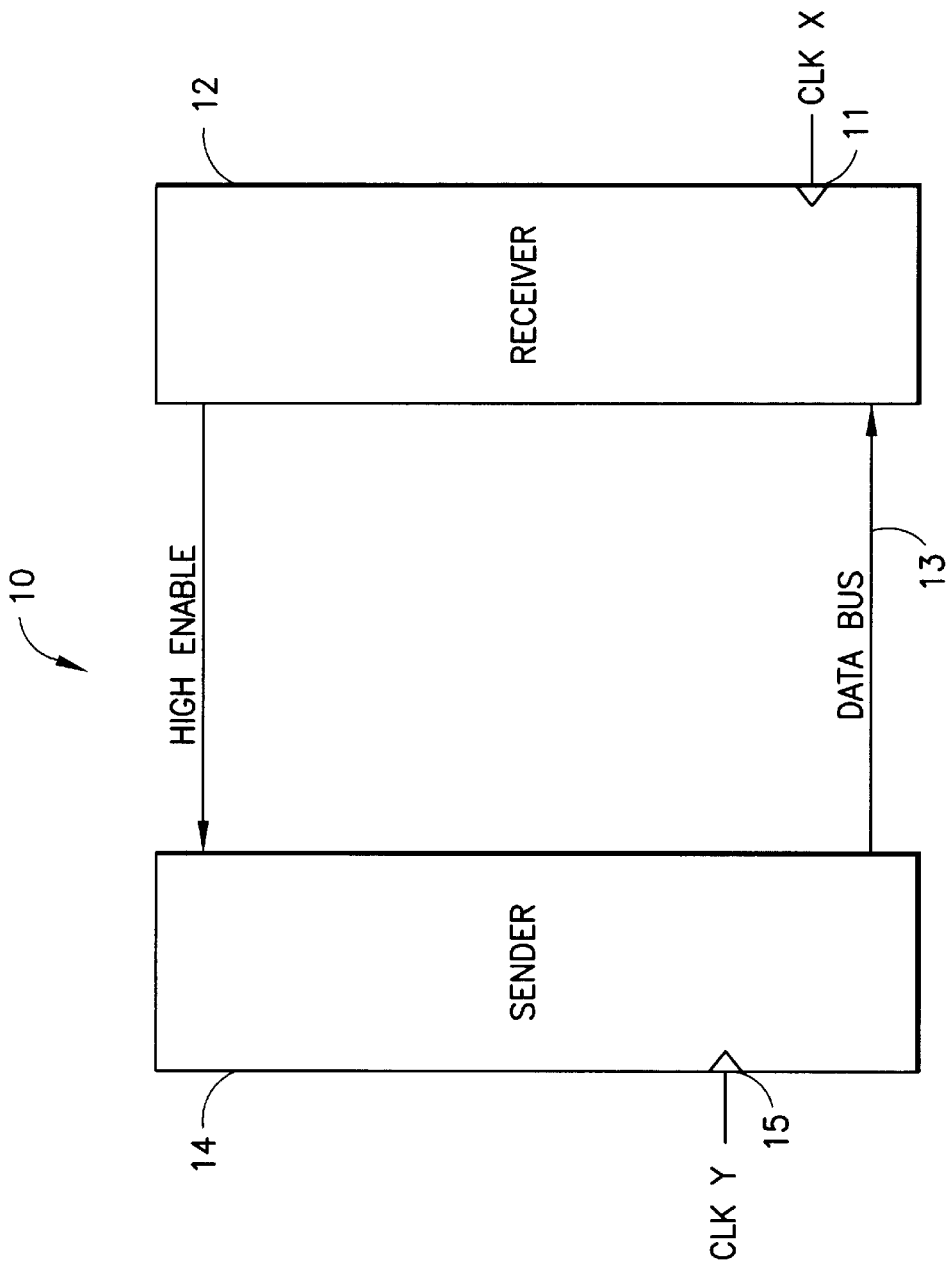
FIG. 1 is a block diagram of a preferred data transmission system incorporating the invention.

FIG. 1 is a block diagram of a data transmission system 10 configured in accordance with the present invention. Data transmission system 10 includes a receiver 12 having a clock X input 11 and a data buffer (not shown). A sender 14 includes a clock Y input 15 and is coupled to receiver 12 by a data bus 13.

Receiver 12 generates a HIGH ENABLE signal for enabling data transmission from sender 14. HIGH ENABLE is a pulse signal generated in response to the receiver clock X when the buffer (not shown) at receiver 12 is capable of accepting data. As receiver 12 can, at most, accept data on every corresponding direction edge (e.g., rising edge of receiver clock X), it generates a HIGH ENABLE pulse at each such edge of receiver clock X. It is important to understand that the HIGH ENABLE pulse rate thus represents the data transfer rate of receiver 12, which is the highest possible data transfer rate between receiver 12 and sender 14. Hereafter, the term "receiver rate" will be used to indicate the data transfer rate of receiver 12.

Figure 2:
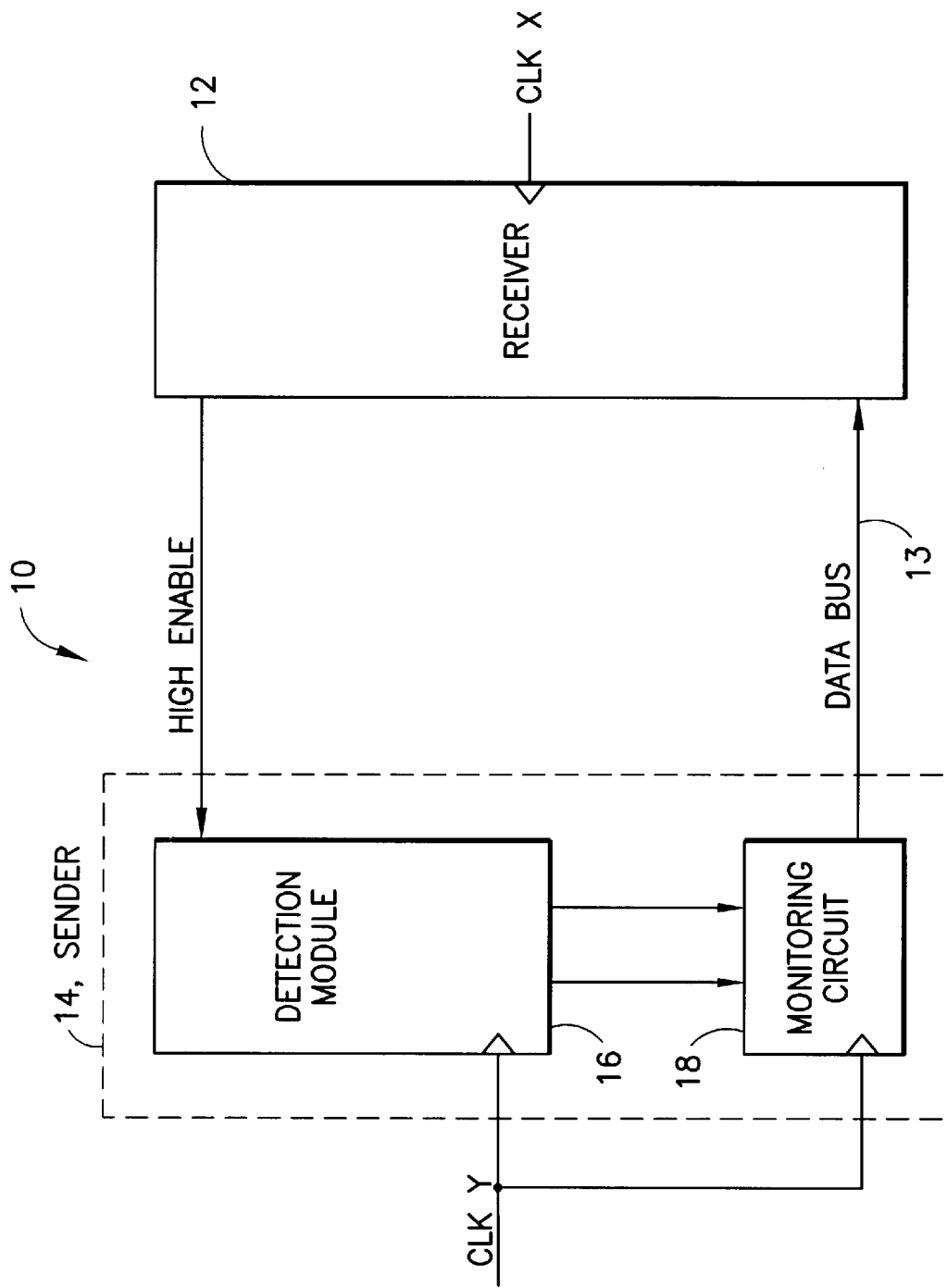
FIG. 2 is a block diagram of the components of the sender of FIG. 1.
Figure 3:
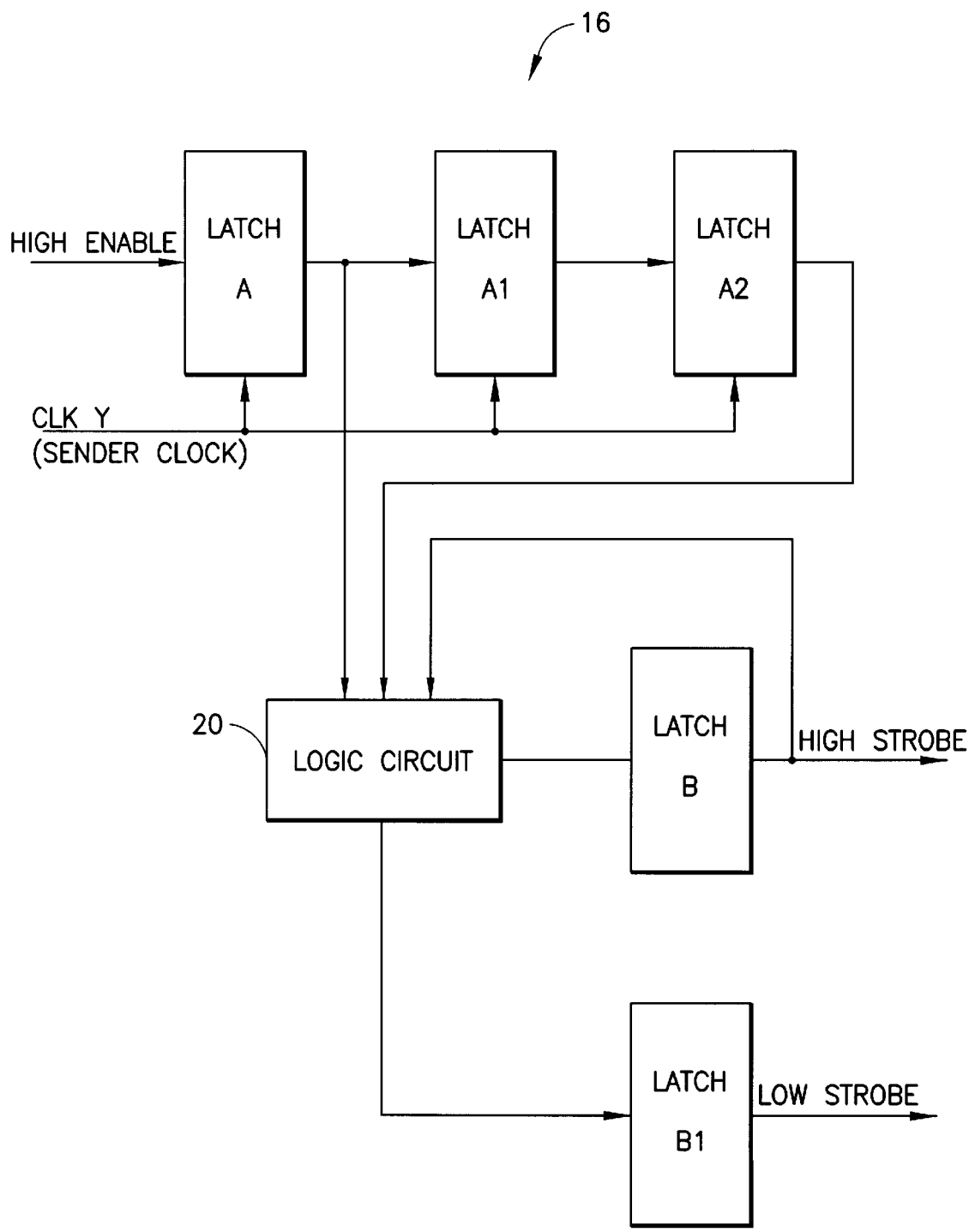
FIG. 3 is the components of a preferred module of FIG. 2.

FIG. 2 is a block diagram illustrating certain components of sender 14. A detection module 16 receives and captures asynchronous HIGH ENABLE pulses from receiver 12. Detection module 16 also performs a rising edge detection on each HIGH ENABLE pulse to ensure a one for one correspondence in transmission and reception rates. As shown in FIG. 3, detection module 16 includes logic circuitry 20 (for detecting the receiver rate of the HIGH ENABLE pulses) and latches A, A1, A2, B and B1.

Latches A, A1 and A2 are connected in series, with the output of a each latch coupled to the input of a successive latch, except for final latch A2, whose output is coupled to the input of logic circuit 20. Each latch has a clock input coupled to the sender clock Y. HIGH ENABLE pulses generated from receiver 12 (FIG. 2) are coupled to the input of latch A (FIG. 3). Latches A, A1 and A2 provide a capturing mechanism for the asynchronous HIGH ENABLE pulses. As is understood by those skilled in the art, latches A, A1 and A2 change state upon a sender clock pulse (or a clock edge). For example, if the sender clock is high and HIGH ENABLE input is high, the output of the latch is high, and if the sender clock is high and HIGH ENABLE input is low, the output of the latch is low. As a result, the latches force HIGH ENABLE pulse into a stable state which allows sender 14, employing a sender clock frequency different than a receiver clock frequency, to sample the asynchronous command signal. Although the utilization of one latch is sufficient to capture an asynchronous HIGH enable pulse, more than one latch is preferably utilized to ensure that HIGH ENABLE pulse is properly captured.

Logic circuitry 20 samples the captured HIGH ENABLE pulse, via latches A and A2, and performs a rising edge detection. In particular, logic circuitry 20 detects a rising edge when HIGH ENABLE pulse goes from an initial low level to a high level. Such a detection allows logic circuitry 20 to initiate transmission of a one data byte for each pulse of HIGH ENABLE. That is to say, the rising edge detection ensures a one for one correspondence in transmission and reception. Specifically, logic circuitry 20 generates an "active" HIGH STROBE pulse in response to a sender clock Y pulse. An "active" HIGH STROBE is a high signal generated by latch B at each pulse of HIGH ENABLE.

After HIGH STROBE is generated, logic circuit 20 automatically generates a LOW STROBE (an inverted HIGH STROBE) via latch B1. For simplicity and savings in hardware, one HIGH ENABLE pulse is used to generate the two strobes as opposed to monitoring an additional enable, i.e., an inverted HIGH ENABLE, and each generating an individual strobe.

As shown in FIG. 2, sender 14 further includes a monitoring circuit 18 which receives and monitors each "active" HIGH STROBE and "inactive" LOW STROBE. Monitoring circuit 18 enables transmission of one data byte from the sender buffer (not shown) upon detection of an "active" HIGH STROBE and/or an "inactive" LOW STROBE. As known to those skilled in the art, such an arrangement can be implemented using pulse detection circuitry, associated with the sender buffer, to enable data transmission at the sender buffer accordingly.

As explained above, data transmission system 10 is capable of automatically adjusting the data transfer rate of sender 14 to the receiver rate, thereby providing a one for one correspondence in transmission and reception rates. This results in minimal utilization of the buffer at receiver 12. As such, data transmission system 10 can operate with a smaller buffer capacity at receiver 12 and not sacrifice data transmission speed. Moreover, data transmission system 10 does not require start/stop protocols to perform data transmission across asynchronous boundaries. The one for one correspondence in transmission and reception ensures that the receiver buffer will never reach its threshold.

In data transmission system 10, the following equations are useful to understand the above interrelationship between the receiver data transfer rate and the clock rate Y of sender 14 and the clock rate X of receiver 12.

$$T = 2 * CLK_X$$

$$\text{Bytes}_{MAX} = LCM \text{ period}/T$$

where:
T=the period required to transmit a single data byte,
Bytes$_{max}$=the maximum number of data bytes transmitted in an LCM period,
LCM period=the least common multiple between the clock rate Y of the sender and the clock rate X of the receiver; and
CLK$_X$=the clock rate X of the receiver.

The clock rate of the receiver CLK$_X$ is multiplied by 2 to produce the transmission time T. Specifically, one byte of data is transmitted for each rising edge of receiver clock rate X (i.e., one data byte per full clock cycle of the receiver clock X) in order to provide enough time for receiver 12 to load the data byte. The LCM period is then divided by T to produce Bytes$_{max}$, the maximum number of data bytes transmitted within the LCM period. It is important to understand that the value of the LCM period is the minimum period for the rising edges of both clocks X and Y to realign, and thus provides a finite frame of reference to calculate the receiver rate.

The following provides an illustrative example of how to calculate the data transfer rate between sender 14 and receiver 12 of data transmission system 10. For instance, if the clock rate X of receiver 12 is every 90 ns and the clock rate Y of sender 14 is every 80 ns, the LCM period is 1440 ns. A full clock rate of receiver 12 is (2×90 ns) 180 ns, and a full clock rate of sender 14 is (2×80 ns) 160 ns. Receiver 12 is able to accept 8 bytes of data in (8×180 ns) 1440 ns, and sender 14 is able to transmit 9 bytes of data in (9×160 ns) 1440 ns. As a result, sender 14 is automatically tuned to transmit data at a rate of 1 byte every (2×80 ns) 160 ns or 8 consecutive bytes with 1 dead cycle of 160 ns. Data transmission system 10 thus transmits data at the receiver rate.

Figure 4:
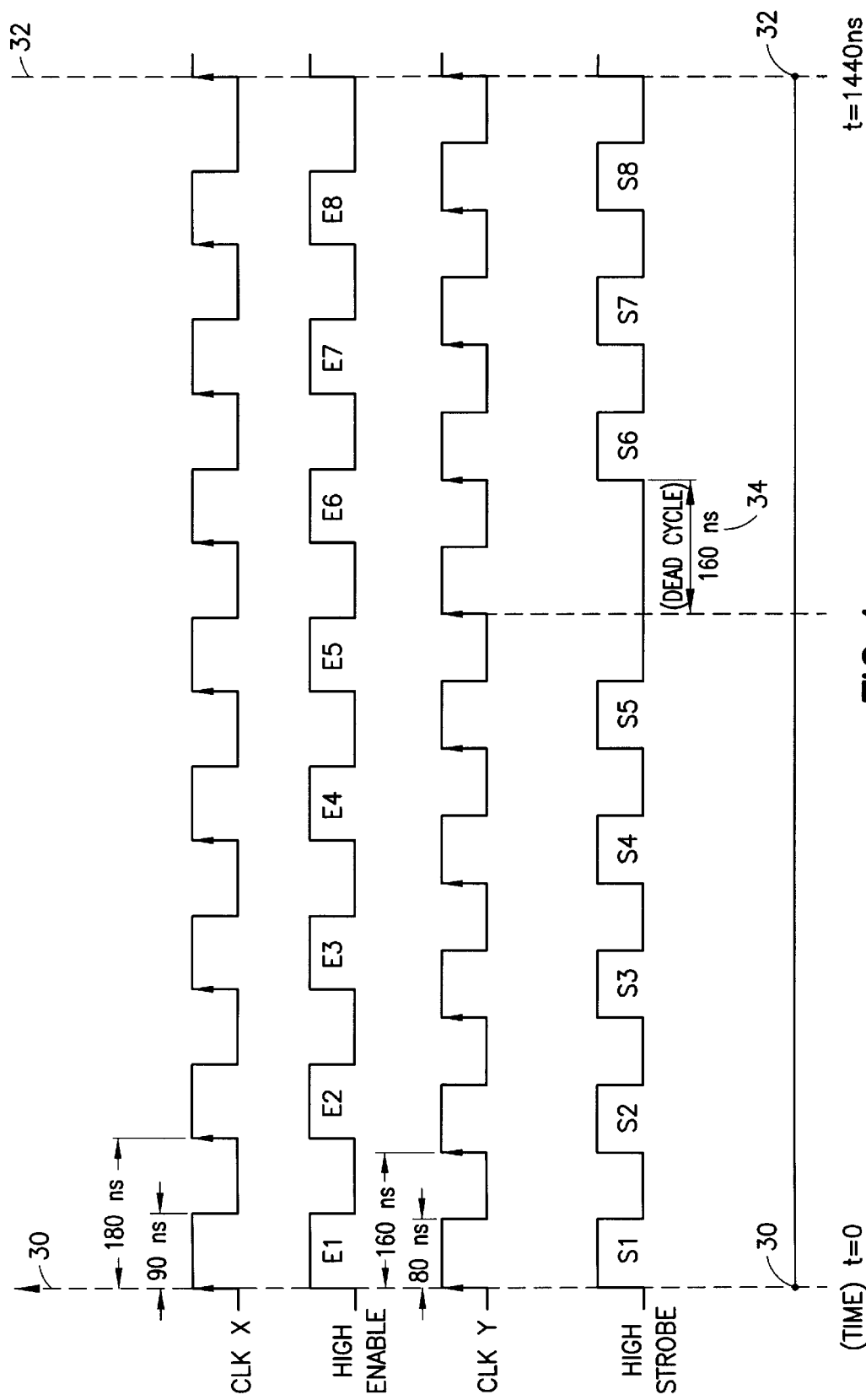
FIG. 4 is a timing diagram of an enable and strobe signal used in the system of FIG. 1.

FIG. 4 illustrates a timing diagram of the example where receiver 12 employs a clock X with a clock rate of 90 ns and sender 14 employs a clock Y with a clock rate of 80 ns. At each rising edge of clock X, receiver 12 generates a HIGH ENABLE pulse, i.e., E1 through E8. Each HIGH ENABLE pulse is then transmitted to sender 14. Sender 14 performs a rising edge detection on HIGH ENABLE and generates an active HIGH STROBE from clock Y for each HIGH ENABLE pulse. For example, sender 14 generates an active HIGH STROBE S1 for E1, S2 for E2 and Sn for En (where n is the number of data bytes to be transmitted).

The LCM period (as previously noted) for the following example is 1440 ns as indicated by the interval between reference number 30 (t=0 ns) and 32 (t=1440 ns). Within the LCM period, sender 14 receives eight HIGH ENABLE pulses, E1 through E8, and generates eight corresponding active HIGH STROBEs, S1 through S8, and one dead cycle indicated by reference number 34. Each "active" HIGH STROBE enables the transmission of one data byte from sender 14, resulting in the transmission of 8 data bytes per 1440 ns, the receiver rate. As can be appreciated by those skilled in the art, dead cycle 34 illustrates the fact that sender 14 can generate only one active HIGH STROBE from clock Y for each HIGH ENABLE pulse, thereby providing a one for one correspondence in transmission and reception.

Another embodiment of data transmission system 12 includes a mechanism at receiver 12 for automatically slowing down data transmission at sender 14 without resorting to the application of start/stop protocols. As previously mentioned, receiver 12 generates a pulse signal, HIGH ENABLE, to control data transmission at sender 12. Receiver 12 can selectively increase the pulse width of HIGH ENABLE which, in turn, will decrease the data transfer rate of sender 12. In particular, logic circuitry 20 will detect the increase in the pulse width of HIGH ENABLE and initiate transmission of one data byte accordingly at the new delayed data transfer rate of receiver 12.

In summary, the present invention comprises a data transmission system for automatically adjusting the data transfer rate of the sender to the data transfer rate of the receiver, thereby achieving the highest possible data transfer rate between sender and receiver. This system provides efficient high speed data transmission with the utilization of a smaller buffer capacity at the receiver, thereby saving circuit space in the form of less buffer circuitry. The present invention also provides a mechanism at the receiver for selectively slowing down the data transmission rate of the sender by selectively increasing the pulse width of a control signal transmitted to the sender.

The invention having thus been described with particular reference to the preferred forms thereof, it will be obvious that various changes and modifications may be made therein without departing from the spirit and scope of the invention as defined in the appended claims.

We claim:

1. In an asynchronous data transmission system having a sender and a receiver, both utilizing different frequency clock signals, a combination comprising:

a) a receiver clock source generating a receiver clock signal;

b) means, associated with said receiver clock source for generating an enable signal pulse at each edge of said receiver clock signal, a time between enable signal pulses related to a maximum data transfer rate of said receiver;

c) a data bus coupled between said sender and said receiver for transmitting signals therebetween; and d) means, at said sender, responsive to receipt of each enable signal pulse from said means b), for automatically adjusting a data transfer rate of said sender to the maximum data transfer rate of said receiver; said means d) receiving said enable signal pulse and initiating transmission of one data segment from said sender for each said enable signal pulse.

2. The combination as recited in claim 1, wherein said means d) comprises:

e) means for capturing an asynchronous enable signal pulse received over said data bus and detecting an edge of said enable signal pulse;

f) means, responsive to said means for capturing, for generating an active strobe signal in response to each detected edge of an enable signal pulse; and g) monitoring circuitry, at said sender, for receiving said active strobe signal and for enabling transmission of one data segment from said sender in response to said active strobe signal, thereby ensuring a one for one correspondence in transmission and reception between said sender and said receiver.

3. The combination as recited in claim 2, wherein said means e) comprises a latch for forcing an asynchronous enable signal into a stable state.

4. The combination as recited in claim 2, wherein said means e) comprises a set of series-connected latches having respective clock inputs from a sender clock source and a first latch having an input coupled to receive said enable signal, for forcing an asynchronous enable signal into a stable state.

5. The combination as recited in claim 1, further comprising means, at said receiver, for altering the data transfer rate of said sender; said means for altering including means for altering a pulse width length of said enable signal.

6. In an asynchronous data transmission system having a sender and a receiver both utilizing different frequency clock signals, a method of automatically controlling a data transfer rate of said sender to equal a data transfer rate of said receiver, said method comprising the steps of:

a) generating an enable signal, at said receiver, once per cycle of the clock signal frequency of said receiver clock frequency;

b) transmitting said enable signal from said receiver to said sender; and c) enabling transmission of one data segment from said sender in response to each enable signal.

7. The method of claim 6, wherein said means for generating comprises generating an enable signal at each rising edge of said receiver clock signal.

8. The method of claim 6, further comprising the step of controlling a length of a pulse width of said enable signal to enable control of the data transfer rate of said sender.

9. The method of claim 6, wherein said enabling step further comprises the following steps:

d) capturing an enable signal pulse at said sender;

e) detecting a rising edge of said enable signal; and f) transmitting one data segment for each rising edge of said enable signal.

* * * * *